J. MAGEE.

Cooking Stove.

No. 1,678. Reissued May 24, 1864.

WITNESSES:

R. H. Eddy

T. R. Hale Jr.

INVENTOR.

John Magee.

J. PETERS, Photo-Lithographer, Washington, D. C.

UNITED STATES PATENT OFFICE.

JOHN MAGEE, OF CHELSEA, ASSIGNOR TO THE NORTON FURNACE COMPANY, OF NORTON, MASSACHUSETTS.

IMPROVEMENT IN COOKING-STOVES.

Specification forming part of Letters Patent No. 35,000, dated April 15, 1862; Reissue No. 1,678, dated May 24, 1864.

*To all whom it may concern:*

Be it known that I, JOHN MAGEE, a citizen of the United States of America, and a resident of Chelsea, in the county of Suffolk and State of Massachusetts, have invented a new new and useful Improvement in Cooking-Stoves; and I do hereby declare the same to be fully described in the following specification, and represented in the accompanying drawings, of which—

Figure 1:
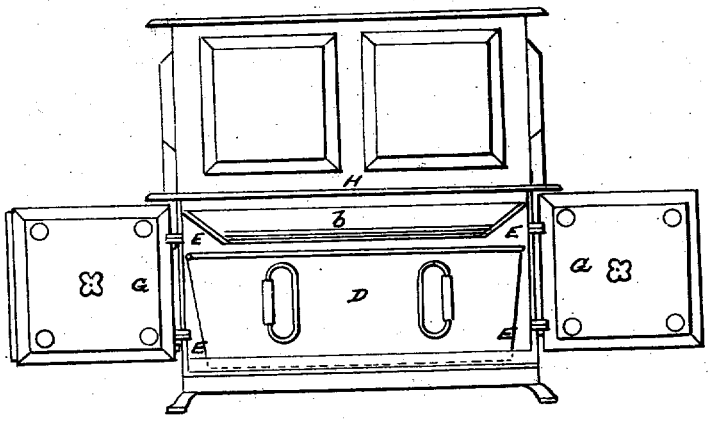
Figure 2:
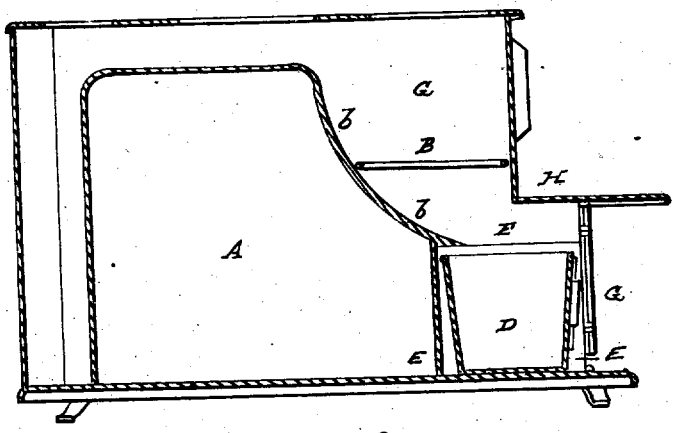
Figure 3:
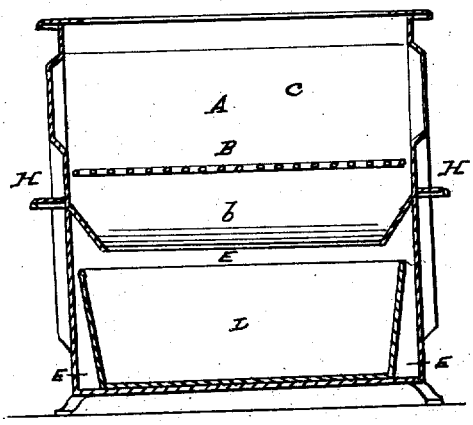

Figure 1 is a front elevation showing the ash-chamber doors as open; Fig. 2, a longitudinal section, and Fig. 3, a transverse section, of a stove embodying the principles of my invention, the plane of section of the last-named figure being through the ash-receiver, to be hereinafter described.

The desideratum in all cooking-stoves is to combine with compactness or the least amount of casting the greatest possible convenience and economy of fuel. This result is being endeavored to be accomplished in various combinations or arrangements of parts, each having peculiar advantages.

The particular object of this invention is to provide a large ash-pit and removable pan, under the grates, without proportionately enlarging the grate, fire-chamber, and boiler-plate, or without increasing the whole stove beyond its heating capacity; also, to insure under such arrangement the falling of the ashes from the grate into the pan, and to derive other advantages with a view of working the stove with ease, convenience, and without liability of its getting out of order.

To enable others to make and use my said invention, I shall now proceed to describe the construction and arrangement of a stove made in accordance with my said invention.

The stove shown in the accompanying drawings is of the usual quadrangular form, and differs externally from those heretofore used in this, that the ash-pit projects from the face-plate which covers the front of the fire-chamber C. The oven A is enlarged by the employment of a curved or crooked front plate, so as to partially extend toward the front under the grate B. Underneath the fire-chamber and grate are arranged converging plates *b*, forming a funnel, hopper, or chute, which directs the ashes thrown or falling from the grate into the ash-pan or drawer D. The latter is placed in the ash-chamber before referred to. This (marked in the drawings E) is arranged so as to project from the front plate of the fire-chamber in proportion to the extent the oven projects toward the front under the grate. The ash-pit is therefore located partly under the grate and partly under the hearth. It is furnished with doors G, or it may be closed in front by any of the known devices, so that access may be had to the ash-pit without removing the grate. The chute or hopper may constitute part of the oven.

In the annexed drawings the back plate of the hopper, which throws the ashes in their descent forward, is the front plate of the oven. By this arrangement the additional advantage is secured that a portion of the heat radiated or otherwise emitted by the burning fuel is absorbed and utilized in the oven.

In addition to the main hearth H, which is here shown arranged immediately underneath the fire-chamber and above the ash-pit, I use a second hearth, located on a level or thereabouts with the bottom of the ash-pit. This arrangement affords great convenience in attending the stove and withdrawing the ash-box.

Having thus described my invention, I shall state my claims as follows:

1. In a stove in which an enlarged oven is used, by the employment of a curved or crooked front oven-plate, recessing the front plate of the stove at and over the grate, so as to leave an enlarged chamber underneath the grate for the purpose of holding a large ash-pan or drawer, removable at the front, substantially as set forth.

2. In a cooking-stove having an enlarged oven, locating the ash-pit over and on a level with a hearth or thereabouts, in front of the stove, substantially as set forth.

3. In cooking-stoves of otherwise ordinary or suitable construction, the employment of two hearths—that is to say, one over and the other under the ash-pit, but both in front of the stove—substantially as set forth.

4. In combination with a curved or crooked interior partition-plate, whereby an enlarged oven is provided, an ash-pit projecting in front of the enlarged oven, open in front, and provided with doors, substantially as set forth.

5. In cooking-stoves of otherwise ordinary or suitable construction, interposing between the grate and the ash-pan a hopper, or the equivalent thereof, to direct the ashes thrown or falling from the grate, substantially as set forth.

6. In combination with a projecting ash-pit and ash-pit hearth, the employment of doors, or equivalent closing-plate, located in front over the hearth, as described, so as to admit of the removal of the ashes without uncovering the grate, substantially as set forth.

In testimony whereof I have signed my name to this specification in presence of two subscribing witnesses.

JOHN MAGEE.

Witnesses:
A. POLLOK,
ROBERT B. BURR.